(12) United States Patent
Ayiranazhi Cailakam et al.

(10) Patent No.: US 10,731,633 B2
(45) Date of Patent: Aug. 4, 2020

(54) POWER GENERATION STABILIZATION CONTROL SYSTEMS AND METHODS

(71) Applicant: GENERAL ELECTRIC COMPANY, Schenectady, NY (US)

(72) Inventors: Mahesh Ayiranazhi Cailakam, Bangalore (IN); Alfredo Sebastian Achilles, Niskayuna, NY (US); Jignesh Govindlal Gandhi, Simpsonville, SC (US); Arne Koerber, Berlin (DE)

(73) Assignee: General Electric Company, Schenectady, NY (US)

( * ) Notice: Subject to any disclaimer, the term of this patent is extended or adjusted under 35 U.S.C. 154(b) by 28 days.

(21) Appl. No.: 15/977,179

(22) Filed: May 11, 2018

(65) Prior Publication Data

US 2018/0335020 A1    Nov. 22, 2018

(30) Foreign Application Priority Data

May 19, 2017 (IN) .............................. 201741017643

(51) Int. Cl.
  *F03D 7/04* (2006.01)
  *F03D 7/02* (2006.01)
  (Continued)

(52) U.S. Cl.
  CPC ............ *F03D 7/048* (2013.01); *F03D 7/0276* (2013.01); *F03D 7/0284* (2013.01); *F03D 9/257* (2017.02); *F03D 17/00* (2016.05); *G05B 13/024* (2013.01)

(58) Field of Classification Search
  CPC ........ F03D 7/048; F03D 17/00; F03D 7/0284; F03D 9/257; F03D 7/0276; G05B 13/024
  See application file for complete search history.

(56) References Cited

U.S. PATENT DOCUMENTS 7,528,496 B2    5/2009 Fortmann
8,237,301 B2    8/2012 Delmerico et al.
(Continued)

FOREIGN PATENT DOCUMENTS

EP    2282053 B1    1/2016
EP    3 007 298 A1    4/2016
(Continued)

OTHER PUBLICATIONS

Aho, J. et al., "An active power control system for wind turbines capable of primary and secondary frequency control for supporting grid reliability," 51st AIAA Aerospace Sciences Meeting including the New Horizons Forum and Aerospace Exposition, pp. 1-13 (2013).
(Continued)

*Primary Examiner* — Thomas C Lee
*Assistant Examiner* — Anzuman Sharmin
(74) *Attorney, Agent, or Firm* — Dority & Manning, P.A.

(57) ABSTRACT

Power generation stabilization control systems and methods include monitoring a frequency of the power grid. In response to detecting a frequency event occurring in the power grid, the method includes activating a control scheme in order to meet one or more grid requirements of the power grid. The control scheme includes increasing a power output of the wind turbine to, at least, a pre-event measured grid power. Further, the control scheme includes calculating a power correction factor for a power set point as a function of, at least, the frequency event. Moreover, the control scheme includes adjusting the power set point via the power correction factor such that the power output follows a predetermined trajectory. In addition, the control scheme includes controlling, via a turbine controller, the wind turbine based on the adjusted power set point for as long as the control scheme is activated.

18 Claims, 10 Drawing Sheets

(51) Int. Cl.
*F03D 9/25* (2016.01)
*G05B 13/02* (2006.01)
*F03D 17/00* (2016.01)

(56) References Cited

U.S. PATENT DOCUMENTS

| | | |
|---|---|---|
| 8,866,323 B2 | 10/2014 | Nielsen |
| 8,946,916 B2 | 2/2015 | Tarnowski |
| 9,506,454 B2 | 11/2016 | Krueger et al. |
| 2009/0194995 A1* | 8/2009 | Delmerico ............ F03D 7/0284 290/44 |
| 2012/0161444 A1 | 6/2012 | Tarnowski |
| 2012/0310426 A1* | 12/2012 | Tarnowski ............ F03D 7/0272 700/287 |
| 2013/0026759 A1 | 1/2013 | Krueger et al. |
| 2015/0022007 A1* | 1/2015 | Ma ............................ H02J 3/24 307/84 |
| 2015/0211492 A1* | 7/2015 | Garcia .................... F03D 7/043 290/44 |
| 2015/0330363 A1* | 11/2015 | Kruger .................. F03D 7/0284 290/44 |
| 2016/0160839 A1 | 6/2016 | Wang et al. |
| 2018/0266392 A1* | 9/2018 | Hovgaard ............... F03D 7/028 |

FOREIGN PATENT DOCUMENTS

| | | | | |
|---|---|---|---|---|
| EP | 3007298 A1 * | 4/2016 | ............. | F03D 7/048 |
| WO | WO2016/184915 A1 | 11/2016 | | |

OTHER PUBLICATIONS

Morren, J. et al., "Wind turbines emulating inertia and supporting primary frequency control," IEEE Transactions on Power Systems, vol. 21, Issue 1, pp. 433-434 (Feb. 2006).

Solberg, O. "A new wind turbine control method to smooth power generation modelling and comparison to wind turbine frequency control," Master of science thesis, pp. 1-68 (2012).

Ullah, N.R. et al., "Temporary primary frequency control support by variable speed wind turbines-potential and applications," IEEE Transactions on Power Systems, vol. 23, Issue 2, pp. 601-612 (May 2008).

Extended European Search report and Opinion issued in connection with corresponding EP Application No. 18172275.2 dated Oct. 10, 2018.

* cited by examiner

POWER GENERATION STABILIZATION CONTROL SYSTEMS AND METHODS

FIELD OF THE INVENTION

The present disclosure relates generally to wind turbines, and more particularly to providing stabilization control for wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine generators and wind farms are typically designed to deliver constant active and reactive power to the utility grid with the delivered power being independent of system frequency. This is accomplished by decoupling the rotor inertia and speed from the grid using fast acting power electronics and controls. Due to increases in wind-farm size and penetration, some utilities are now requiring that wind-farm and wind-turbine controls provide enhanced capabilities such as frequency stabilization.

Conventional synchronous generators naturally respond to frequency disturbances due to the grid coupled rotating inertia and governor controls of such generators. Some utility operators require that wind turbines respond in a similar way to frequency disturbances. Specifically, a short duration power increase (for example, five or ten percent of rated power) may be needed when frequency dips below a certain threshold.

It is a well-known characteristic of utility systems that the grid frequency tends to decrease when the load exceeds the generation and to increase when the generation exceeds the load. Such decreases or increases may occur in a monotonic manner, an oscillating manner, or combinations thereof when the grid is subjected to a sudden change in the balance between generation and load. It is a consideration in the design of such a system that any method to achieve compensation of such decreases or increases should be one that does not cause unacceptable coupling between grid oscillatory modes and the wind turbine mechanical oscillatory modes.

Modern wind farms include the capability to curtail output power below the level available based on wind conditions. Utility grid operators sometimes require curtailment if the available grid power is not needed by the utility. Continuous curtailment may also be required by utility operators to provide an operating range for the wind farm to increase power output when frequency decreases.

Thus, as grid requirements continue to change, wind turbine power systems are continuously in need of being able to meet such requirements. Accordingly, the present disclosure is directed to systems and methods for controlling a wind turbine connected to a power grid that activates a predefined control scheme in response to a frequency drop in the power grid in order to the grid requirements thereof.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for controlling a wind turbine connected to a power grid. The method includes monitoring a frequency of the power grid. In response to detecting a frequency event, such as a frequency drop or decrease, occurring in the power grid, the method includes activating a control scheme in order to meet one or more grid requirements of the power grid. The control scheme includes increasing a power output of the wind turbine to, at least, a pre-event measured grid power. Further, the method includes calculating a power correction factor for a power set point of the wind turbine as a function of, at least, the frequency event. Moreover, the method includes adjusting the power set point via the power correction factor such that the power output follows a predetermined trajectory. In addition, the control scheme includes controlling, via a turbine controller, the wind turbine based on the adjusted power set point for as long as the control scheme is activated.

In one embodiment, the control scheme further includes applying a gain to the power correction factor to obtain an adjusted power correction factor. More specifically, in such embodiments, the gain may be determined as a function of one or more electrical or mechanical limits of the wind turbine.

In another embodiment, the control scheme may include calculating a torque correction factor as a function of the adjusted power correction factor and a speed of the wind turbine, adding the torque correction factor to a torque set point as a feedforward term, and adding the adjusted power correction factor to the power set point. In such embodiments, the method may include imposing an above rated mode when the control scheme is activated such that a speed regulator governs a pitch angle and a power regulator governs the torque set point.

In further embodiments, the method may include switching a mode of operation when the control scheme is deactivated from the imposed above rated mode to an optimum operation condition or switching the mode of operation from the above rated mode of operation to a below rated mode of operation where the speed regulator is controlling the torque set point.

Thus, in certain embodiments, if the wind turbine is operating in the below rated mode of operation when the frequency event is detected, the method may include switching the mode to the above rated mode of operation when the control scheme is activated. In such embodiments, the method may also include switching the mode of operation back to the below rated mode of operation when the frequency event is over.

In additional embodiments, the control scheme may include changing a speed set point of the wind turbine to a rated speed of the wind turbine via a bumpless transfer. More specifically, in one embodiment, while switching the mode back to the below rated mode of operation, the step of changing the speed set point of the wind turbine to the rated speed of the wind turbine via the bumpless transfer may include tracking, via at least one filter, a current speed of the wind turbine and gradually increasing the speed set point based on the tracking until the rated speed is reached so as to smoothly transition out of the control scheme.

In yet another embodiment, if the wind turbine is operating in the above rated mode of operation, the method may include transitioning out of the control scheme when the frequency event is over via a standard or normal operating process. For example, in one embodiment, the standard operating process may include increasing the adjusted power set point to a predetermined power set point.

In still further embodiments, the method may include disabling one or more control loops of the turbine controller for as long as the control scheme is activated, wherein disabling the one or more control loops prevents an additional power drop of the wind turbine.

In another aspect, the present disclosure is directed to a method for controlling a wind turbine connected to a power grid. The method includes monitoring a frequency of the power grid. In response to detecting a frequency event occurring in the power grid, the method includes activating a control scheme in order to meet one or more grid requirements of the power grid. The control scheme includes calculating a power correction factor for the power set point as a function of, at least, the frequency event. Further, the control scheme includes calculating a torque correction factor as a function of the power correction factor and a speed of the wind turbine. Moreover, the control scheme includes adjusting the power set point via the power correction factor. In addition, the control scheme includes adding the torque correction factor to the adjusted power set point as a feedforward term. Thus, the control scheme also includes controlling, via a turbine controller, the wind turbine based on the adjusted power set point for as long as the control scheme is activated. It should also be understood that the method may further include any of the additional features and/or steps as described herein.

In yet another aspect, the present disclosure is directed to a stabilization system for a wind power generation system connected to a power grid. The stabilization system includes a deadband limiter for detecting when a signal is outside of a respective signal range, wherein the signal comprises a frequency. Further, the stabilization system includes a power shaper for providing a supplementary power correction factor as a function of the frequency. In addition, the system includes a torque shaper for initially increasing a power output of the wind turbine to a pre-event measured grid power and adjusting a power set point as a function of the supplementary power correction factor so as to temporarily boost the supplied power to the power grid in response to the signal being outside of the respective signal range. Moreover, the system includes a turbine controller for controlling the wind turbine based on the adjusted power set point for as long as the signal is outside of the respective signal range. It should also be understood that the system may further include any of the additional features as described herein.

More specifically, in one embodiment, the stabilization system may further include a gain block for applying a gain to the power correction factor to obtain an adjusted power correction factor, the gain being determined as a function of one or more electrical or mechanical limits of the wind turbine.

In another embodiment, the system may include a power regulator optimization module for calculating a torque correction factor as a function of the adjusted power correction factor and a speed of the wind turbine, adding the torque correction factor to a torque set point as a feedforward term, and adding the adjusted power correction factor to the power set point.

In additional embodiments, the system may include an operational mode selector for determining a mode of operation of the wind turbine. In such embodiments, the operational mode selector is configured to impose an above rated mode when the control scheme is activated such that a speed regulator is governing a pitch angle and a power regulator is governing the torque set point. In addition, the operational mode selector is further configured to switch a mode of operation when the control scheme is deactivated from the imposed above rated mode to an optimum operation condition or switch the mode of operation from the above rated mode of operation to a below rated mode of operation where the speed regulator is controlling the torque set point.

In one embodiment, if the wind turbine is operating in the below rated mode of operation when the frequency event is detected, the turbine controller switches the mode to the above rated mode of operation in response to the signal being outside of the respective signal range. In further embodiments, the turbine controller may also switch the mode back to the below rated mode of operation in response to the signal returning within the respective signal range.

In several embodiments, the stabilization system may also include a bumpless transfer module for changing a speed set point of the wind turbine to a rated speed of the wind turbine while switching the mode back to the below rated mode of operation. More specifically, the bumpless transfer module may include a low-pass filter for tracking a current speed of the wind turbine and gradually increasing the speed set point based on the tracking until the rated speed is reached so as to smoothly transition out of the control scheme.

In yet another embodiment, the turbine controller may disable a drivetrain damper of the wind turbine in response to the signal being outside of the respective signal range.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
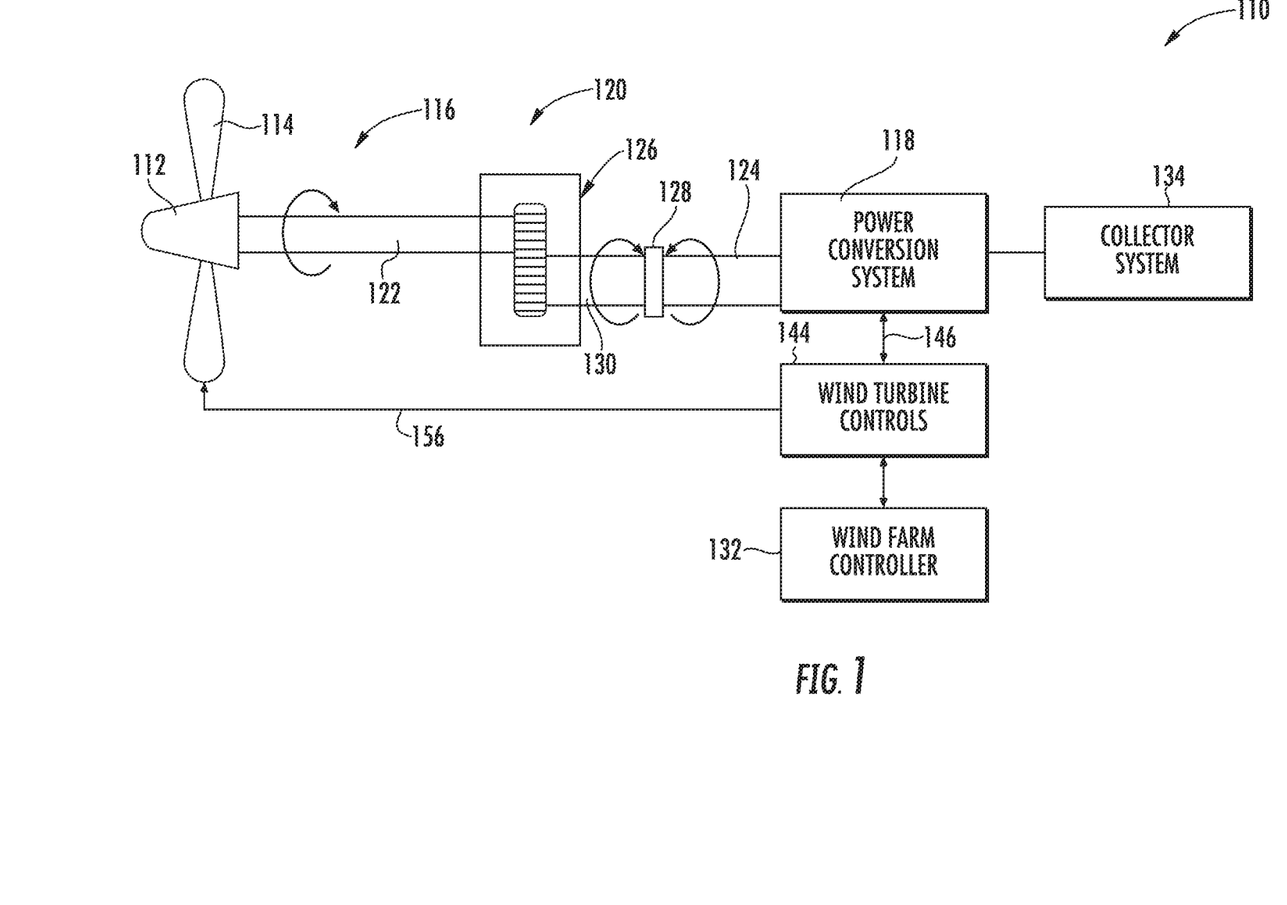
FIG. 1 illustrates a schematic block diagram of one embodiment of a wind turbine according to the present disclosure.

Referring now to the drawings, FIG. 1 illustrates a wind turbine system 110 operable to generate electric power is illustrated. As shown, the wind turbine system 110 includes a hub 112 having multiple rotor blades 114 mounted thereto. The rotor blades 114 convert the mechanical energy of the wind into a rotational torque, which is further converted into electrical energy by the wind turbine system 110. The wind turbine system 110 further includes a turbine portion 116 that is operable to convert the mechanical energy of the wind into a rotational torque and a power conversion system 118 that is operable to convert the rotational torque produced by the turbine portion 116 into electrical power. A drive train 120 is provided to couple the turbine portion 116 to the power conversion system 118. The wind turbine power conversion system 118 typically comprises a doubly fed asynchronous generator with a power electronic converter for rotor field control or a synchronous generator for use with a full power electronic converter interface to collector system 134.

The turbine portion 116 includes a turbine rotor low-speed shaft 122 that is coupled to the hub 112. Rotational torque is transmitted from rotor low-speed shaft 122 to a generator shaft 124 via drive train 120. In certain embodiments, such as the embodiment illustrated in FIG. 1, drive train 120 includes a gear box 126 transmitting torque from low-speed shaft 122 to a high speed shaft 130. A high speed shaft 130 is coupled to power conversion system shaft 124 with a coupling element 128.

Power conversion system 118 is coupled to wind turbine controls 144. Wind turbine controls 144 receive signals 146 from the power conversion system that are representative of the operating parameters of the system. Wind turbine controls 144, in response, may generate control signals, for example a pitch signal 156 to change the pitch of blades 114 or a torque signal for the power conversion system. Wind turbine controls 144 are also coupled to a wind farm controller 132.

Figure 2:
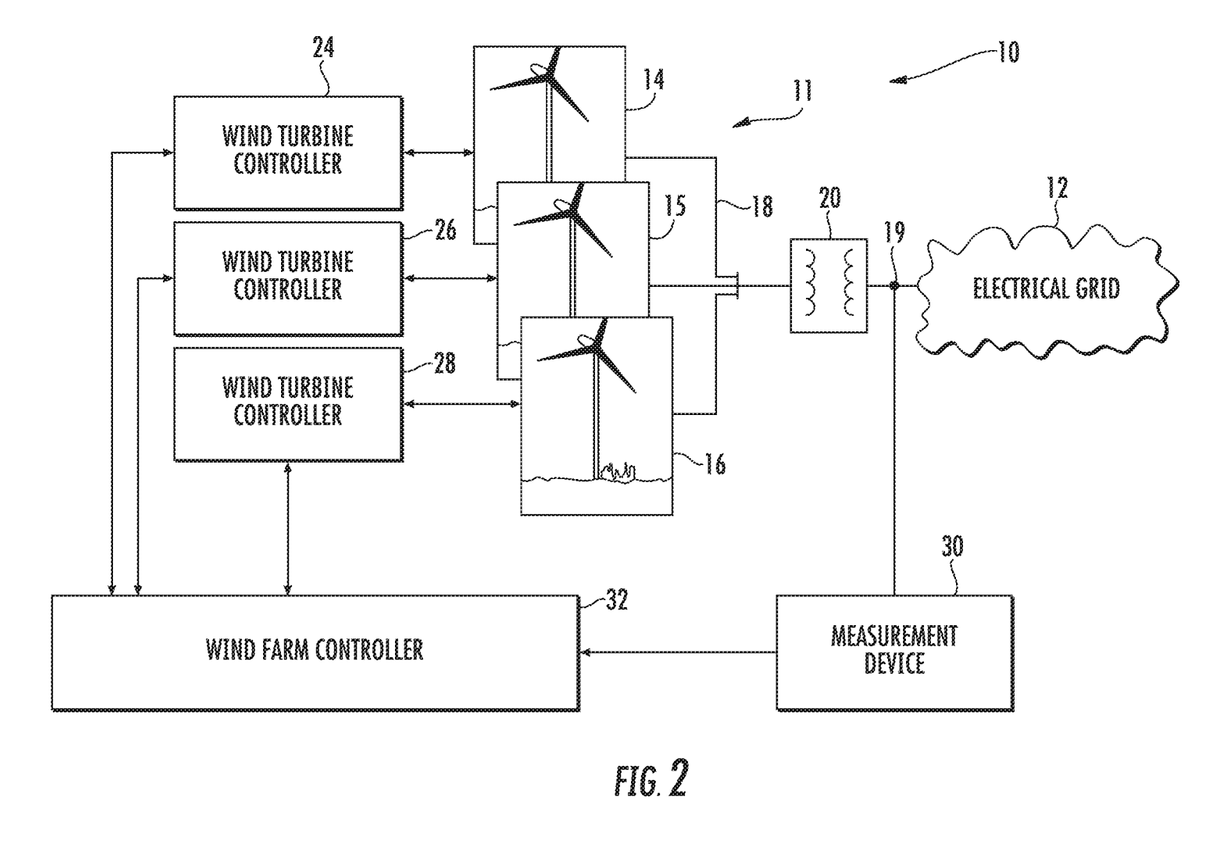
FIG. 2 illustrates a schematic block diagram of one embodiment of a wind farm according to the present disclosure.

Referring to FIG. 2, an electrical power generation system 10 for generating electrical power is illustrated. For purposes of illustration, the electrical power generation system 10 includes a wind farm 11 electrically coupled to an electrical grid 12. The electrical grid 12 is utilized to transfer electrical power from the wind farm 11 to electrical loads.

The wind farm 11 is provided to generate electrical power utilizing wind energy. The wind farm 11 includes wind turbines 14, 15, 16 (more generally referenced as "energy sources"), a collector system 18, a transformer 20, wind turbine controllers 24, 26, 28, a measurement device 30, and a wind farm controller 32. It should be noted that a number of wind turbines utilized in the wind farm 11 can vary. For example, the number of wind turbines in the wind farm 11 can be greater than three wind turbines or less than or equal to three wind turbines.

The wind turbines 14, 15, 16 are provided to generate voltages and currents utilizing wind energy. The wind turbines 14, 15, 16 are operably controlled utilizing the wind turbine controllers 24, 26, 28, respectively, which communicate with the wind turbines 14, 15, 16, respectively.

The wind turbine controllers 24, 26, 28 are configured to generate command signals which control operation of the wind turbines 14, 15, 16, respectively. Further, the wind turbine controllers 24, 26, 28 are provided to measure operational parameters associated with the wind turbines 14, 15, 16 respectively. The wind turbine controllers 24, 26, 28 operably communicate with the wind farm controller 32.

The collector system 18 is electrically coupled to the wind turbines 14, 15, 16 and routes voltages and currents from each of the turbines to the power transformer 20. The power transformer 20 receives the voltages and currents from the wind turbines 14, 15, 16 and outputs a voltage and a current having desired characteristics onto the electrical grid 12. For example, the power transformer 20 can output a voltage having a desired amplitude and a current having a desired amplitude onto the electrical grid 12.

In one embodiment, the measurement device 30 is electrically coupled to a point of interconnection 19 between the transformer 20 and the electrical grid 12. The measurement device 30 is configured to measure electrical parameters associated with the electrical grid. For example, the measurement device 30 is configured to measure a voltage level ($V_{POI}$) at the point of interconnection 19, a real power level ($P_n$) at the point of interconnection 19, and a frequency level ($F_n$) at the point of interconnection 19. It should be noted that the measurement device 30 can measure parameters on either side of the transformer 20 or at individual turbines.

The wind farm controller 32 is provided to control operation of the wind turbines 14, 15, 16 based on measured or estimated parameter values at the point of interconnection 19 associated with either the wind farm 11 or the electrical grid 12. The wind farm controller 32 is configured to generate command messages that are received by the wind turbine controllers 24, 26, 28 for controlling operation of the wind turbines 14, 15, 16, respectively. In addition, the wind turbines 14, 15, 16 can be operated based on various operational modes of operation.

Figure 3:
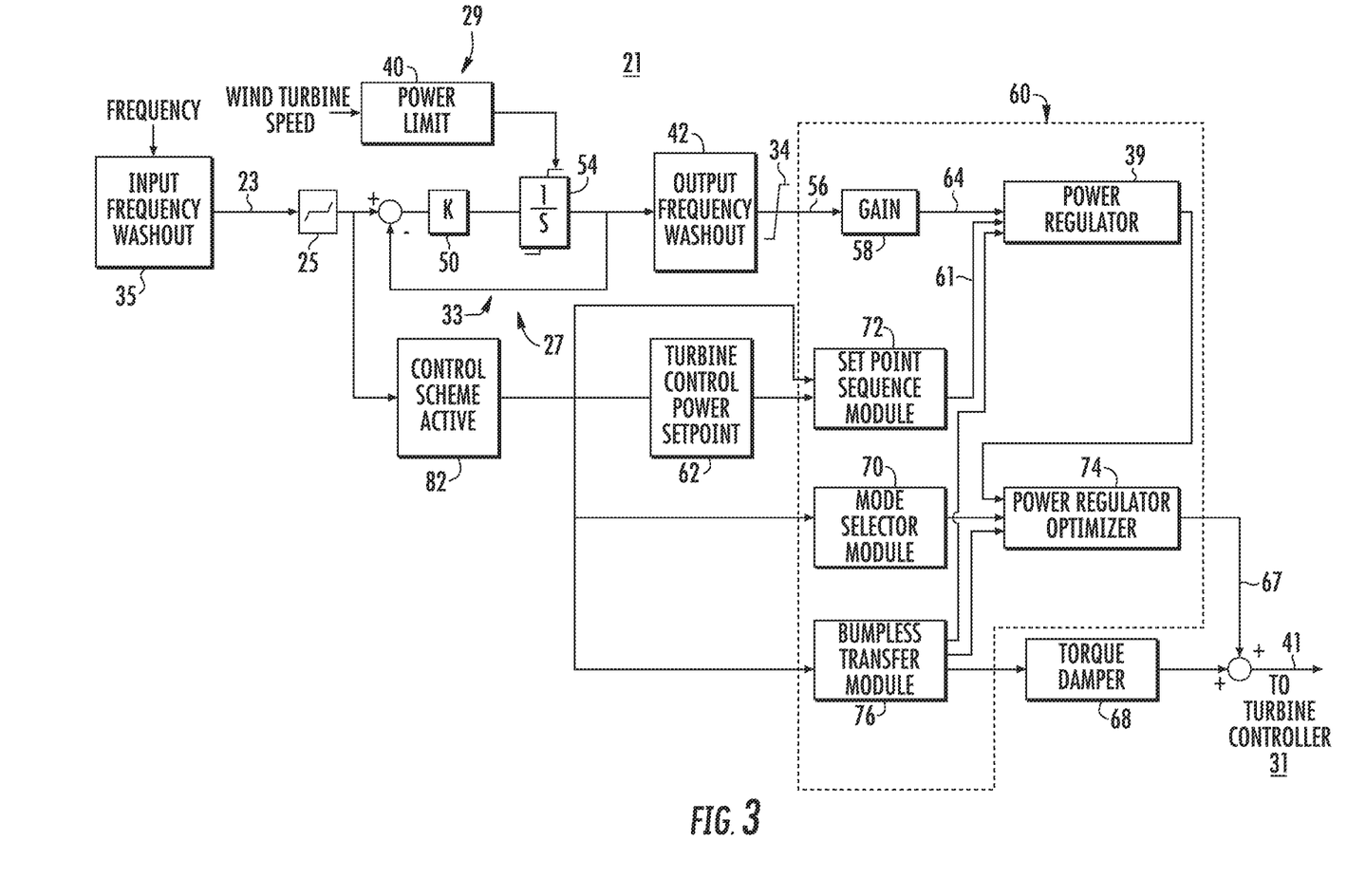
FIG. 3 illustrates a more detailed schematic block diagram of one embodiment of a control system according to the present disclosure.

Referring now to FIG. 3, a schematic block diagram of a control system according to the present disclosure is illustrated. As shown, the control system includes a stabilization system 21 for a power generation system 10 (such as one of the wind turbines 14, 15, 16) connected to a power grid 12. Further, as shown, the stabilization system 21 includes an input frequency washout 35 configured for tracking slow variations in grid frequency and used for calculating frequency deviations around a center point. In addition, the stabilization system 21 includes a deadband limiter 25 configured for detecting when a signal 23 from the input frequency washout 35 is outside of a signal range. The signal 23 may include any appropriate signal. For example, as shown, the signal 23 corresponds to system frequency. Further, the signal may be obtained either by direct measurement of the respective signal or by measurement of another signal and computations to obtain the respective signal. Thus, in response to detecting a frequency event, such as a frequency drop or decrease that is outside of the signal range, the stabilization system 21 is configured to activate a control scheme in order to meet one or more grid requirements of the power grid 12 for as long as the signal 23 is outside of the signal range.

In such embodiments, the deadband limiter 25 is configured to limit the frequency deviation signal between frequency threshold values determined by the application. Utility grid frequency typically has a nominal value equal to either 50 Hertz (Hz) or 60 Hz. However, the frequency may drift somewhat such that the center point is at a different value such as 59.9 Hz rather than 60 Hz, for example. As such, the input frequency washout 35 is used to find the actual frequency rather than the nominal value. Typically, the frequency is measured at a substation of the wind farm 11, but measurement at that location is not required.

Further, the frequency deadband limiter 25 is used to limit the response of the stabilization system 21 to sufficiently large events. The frequency will always vary somewhat due to dithering that occurs when loads come on and off the system or example, load variation typically affects frequency by about 0.05 Hz, depending on the system. As such, the stabilization system 21 is useful for more significant events that occur when a sudden difference is present between load and generation. Such significant events may include a utility system losing a large generator or a transmission line tripping. In one example, the deadband is set to a predetermined value, such as plus or minus 0.12 Hz off the center point frequency. The selection of this limit is typically based on factors such as the location and nature of the power generation system and the variability of frequency center points. The stabilization system 21 may have a variable limit that is set by the end user after taking into account such factors.

Still referring to FIG. 3, as shown, the stabilization system 21 may also include a power shaper 33 configured for generating a supplementary power correction factor 56 as a function of the frequency in response to the signal 23 being outside of the signal range. As used herein, the power correction factor 56 may include any linear or non-linear term. In additional embodiments, the power correction factor 56 may be calculated in real-time or may be predetermined static factor pre-programed in the turbine controller 31. Moreover, as shown, the stabilization system 21 includes a limit controller 29 configured to prevent the adjustment signal from causing the energy source of the power generation system to operate outside of at least one operating constraint. Further, as shown, the stabilization system 21 includes a turbine controller 31 for controlling the power generation system 10 based on an adjustment signal 41 for as long as the signal 23 is outside of the respective signal range.

As such, the power shaper 33 provides a signal for the turbine controller 31 to transiently boost power while staying within energy source operating constraints and limiting coupling between grid oscillatory modes and energy source mechanical modes. Although the word "power" is used, torque could alternatively be used for the same effect, and power as used herein is meant to encompass torque. As such, the system may be set up to be based on power throughout, torque throughout, or a combination of power and torque. For example, in one embodiment, the control scheme is completed for a power response, but implementation is such that the wind turbine obtains a torque command that corresponds to the desired power control.

Mechanical oscillations are a common concern in power systems. Such systems may be characterized by an elemental rotating system having two inertias connected by a spring. The spring can be a physical shaft or the behavior of generators interconnected by a transmission network. More specifically, a wind turbine has some inertia in the wind turbine hub end and some inertia in the wind turbine generator with the shaft between them being susceptible to spring type motion and oscillatory modes. Additionally, other generators on the utility system have respective inertias that may result in oscillatory modes. Such oscillatory modes may perturb the utility grid frequency.

Accordingly, the power shaper 33 is configured to shape a pulse in response to the frequency event and decrease the frequency disturbance magnitude in the power generation system. Although the power shaper 33 may be made to address either positive or negative frequency events, the shaper 33 will be particularly useful in embodiments addressing negative frequency events because less alternatives (other than curtailed power operation) exist to momentarily increase power above nominal.

The limit controller 29 is used to prevent turbine over and under speed operation. Most 60 Hz wind turbines have a predetermined speed range, such as for example from about 800 rotations per minute (rpm) to about 1700 rpm. The goal when the operating constraint is generator rotor speed is to ensure that no request is processed for additional power when the generator is close to the wind turbine cut-in speed limit and that no control signal for reducing power is processed when the generator is close to the wind turbine cut-out speed limit. In one embodiment, the limit controller 29 includes a power limiter 40 configured to change the bounds of integrator 54 in response to the wind turbine speed (i.e. the generator speed or the rotor speed). The generator speed is just one example of an operating constraint and other constraints may be used in addition or alternatively, as discussed below.

More specifically, in certain embodiments, the adjustment signal 41 may include any combination of a power command, a torque command, and/or a speed command. The adjustment signal 41 is typically further constrained so as to limit oscillatory coupling. If the grid frequency is oscillatory but at a level smaller than the deadband, no adjustment signal is generated. If the grid is oscillatory and larger than the deadband, then the shaping characteristic prevents the compounding of the oscillation. The shape of the power adjustment signal can be controlled by gain and ramp values that will typically vary with application, due to differing utility requirements and responses.

Referring still to FIG. 3, the illustrated stabilization system 21 further includes an output frequency washout 42 configured to drive an adjustment signal ΔP to zero. The output frequency washout 42 is shown in the illustrated position for purposes of example only and may be present in any appropriate control block. For example, in another embodiment, the washout function may be included within control loop 27. In addition, the stabilization system 21 may include a limiter 34 configured to modify an output of the output frequency washout 42. Thus, as shown, the output of the limiter 34 may be referred to herein as the supplementary power correction factor 56.

More specifically, as shown in the embodiment of FIG. 3, the power shaper 33 includes a gain block 50 and a control loop 27 used to provide a shaping response which is faster upon initiation and slower upon recovery (in other words "fast up, slow down"). The gain of block 60 may vary and will typically be set according to location and system requirements.

Within the control loop 27, the gain block 50 is used to control the rate of signal adjustment for the integrator 54. The gain of block 50 is typically a fixed value designed to control the response of the control loop 27. Thus, the frequency is quickly compensated for upon an event, but the power adjustment after the event recovers slowly. In addition, the gain block 50 defines the pulse shape and may be varied based on system needs or conditions. For example, in one embodiment, at least one of the parameter settings for the gain block 50 is configured for having a variable value in response to at least one of a utility condition, a utility command, generator speed, and air density.

Referring still to FIG. 3, as shown, the stabilization system 21 further includes a torque shaper 60 configured to modify the supplementary power correction factor 56 before being used as an input for the turbine controller 31. More specifically, as shown, the torque shaper 60 receives the supplementary power correction factor 56 and applies a tunable gain to the signal via gain block 58 to obtain an adjusted power set point 64. In certain embodiments, the gain may be a function of one or more electrical and/or mechanical system capabilities as well as limits requested from the utility/grid operator. The adjusted power set point 64 can then be further modified via one or more modules 70, 72, 74, 76 within the torque shaper 60, which are discussed in more detail below.

Figure 4:
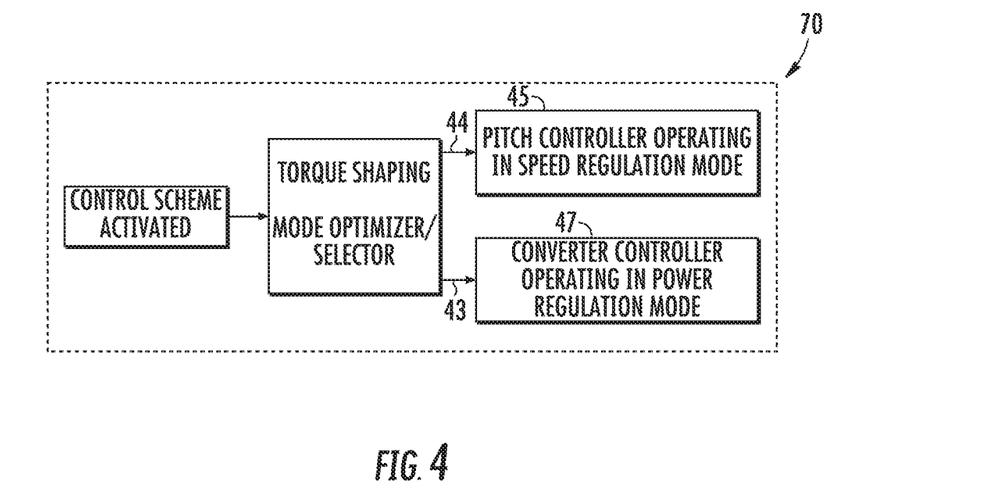
FIG. 4 illustrates a schematic block diagram of one embodiment of an operational mode selector of a turbine controller of a wind turbine according to the present disclosure.

More specifically, FIGS. 4-11 illustrates various schematic block diagrams of the various modules 70, 72, 74, 76 of the torque shaper 60 illustrated in FIG. 3. For example, as shown in FIGS. 3-6, one of the modules of the torque shaper 60 may include an operational mode selector module 70. In certain embodiments, the operational mode selector module 70 allows the turbine controller 31 to assign appropriate regulation functions for the wind turbine 10. More specifically, as shown in FIG. 4, the mode selector module 70 allows the turbine controller 31 to assign appropriate regulation functions (e.g. torque set point 43 and angle set point 44) for the pitch drive system 47 and the converter controller 45 when the control scheme is activated (as shown at block 82 of FIG. 3). For example, as shown in FIG. 4, the pitch controller 45 is operating in a speed regulation mode and the converter controller 47 is operating in power regulation mode. As such, the control scheme, when activated, is configured to optimize operation of the turbine controller 31 such that the power converter operates to regulate power while the pitch system will regulate the speed during the frequency event.

Figure 5:
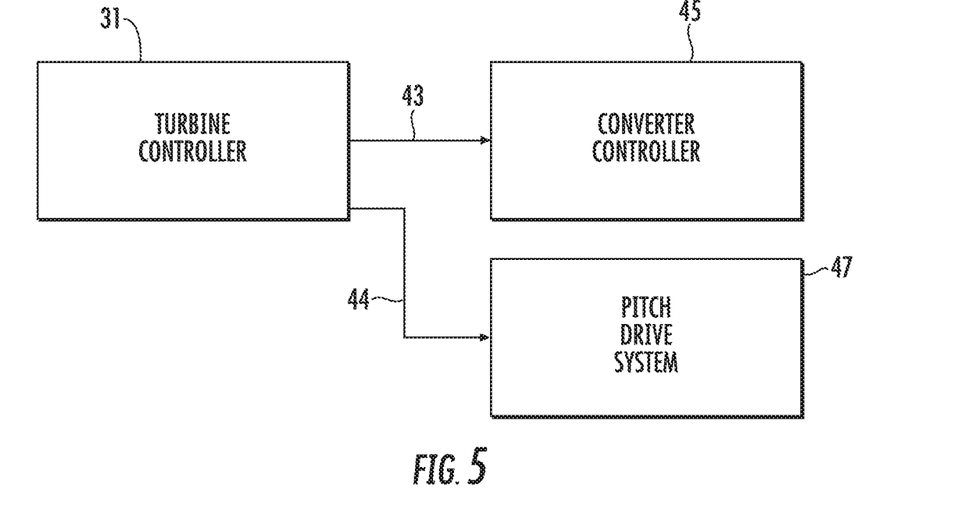
FIG. 5 illustrates a schematic block diagram of one embodiment of a turbine controller of a wind turbine according to the present disclosure.
Figure 6:
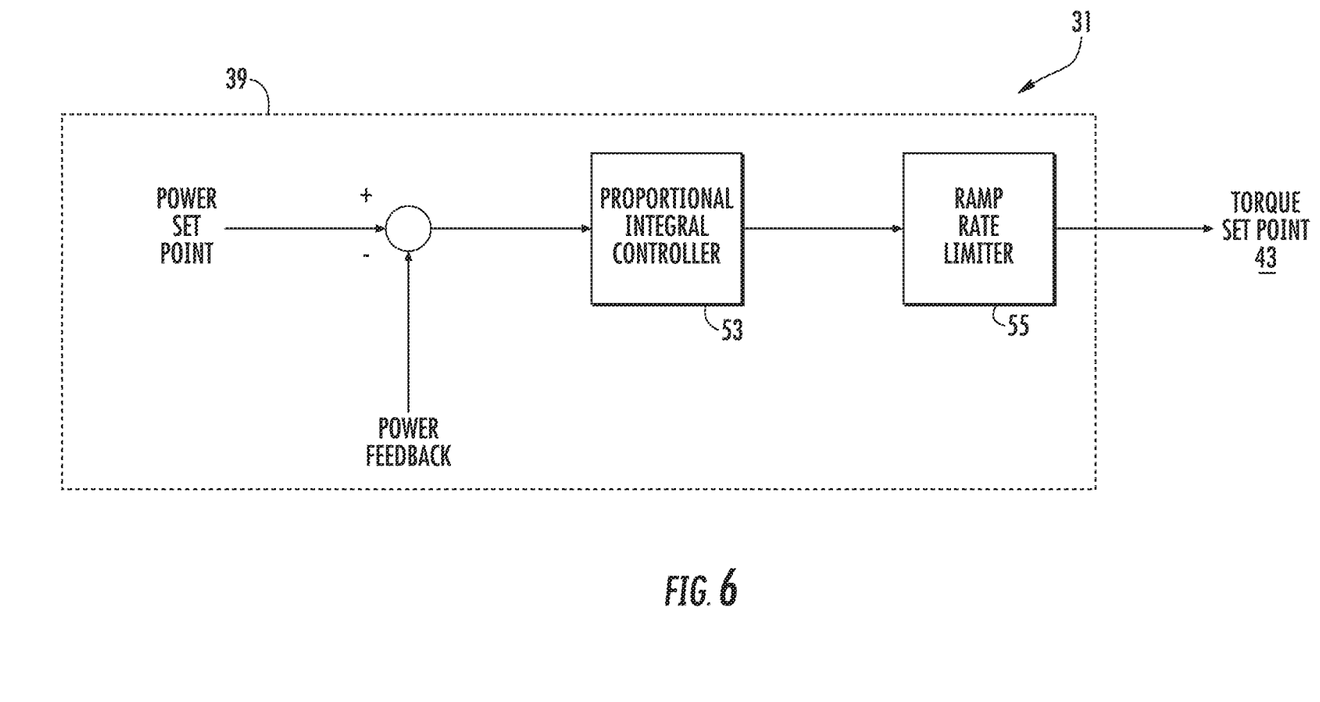
FIG. 6 illustrates a more detailed schematic block diagram of one embodiment of the turbine controller according to the present disclosure, particularly illustrating a power regulator generating a torque set point.

More specifically, as shown in FIGS. 3 and 6, the power regulator 39 of the turbine controller 31 may generate the torque set point 43 using a proportional integral controller 53. Further, as shown, the proportional integral controller 53 receives a difference between the power set point of the power generation system 10 and the power feedback from the grid 12. The output of the proportional integral controller 53 may then be fed into a ramp rate limiter 55 that generates the torque set point 43 for the converter controller 45 (FIG. 5). Further, as shown in FIG. 3, the torque set point 43 from the power regulator 39 may be used as an input to the power regulator optimizer module 74, which is further discussed below.

Figure 7:
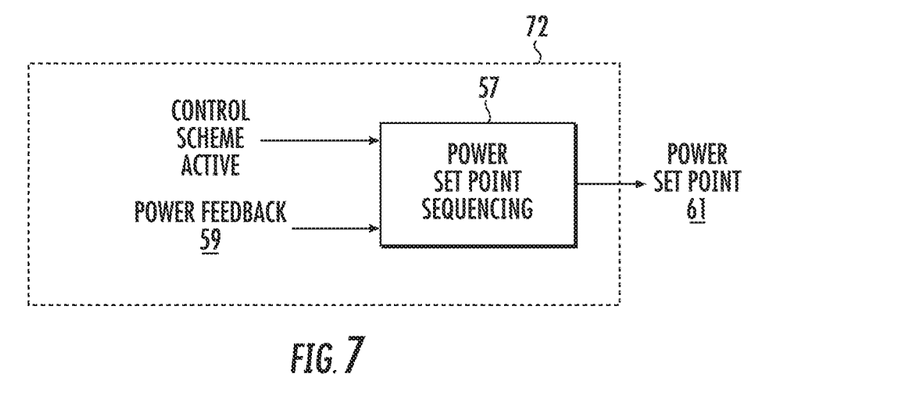
FIG. 7 illustrates a schematic block diagram of one embodiment of a power set point sequencing module of the turbine controller according to the present disclosure.
Figure 8:
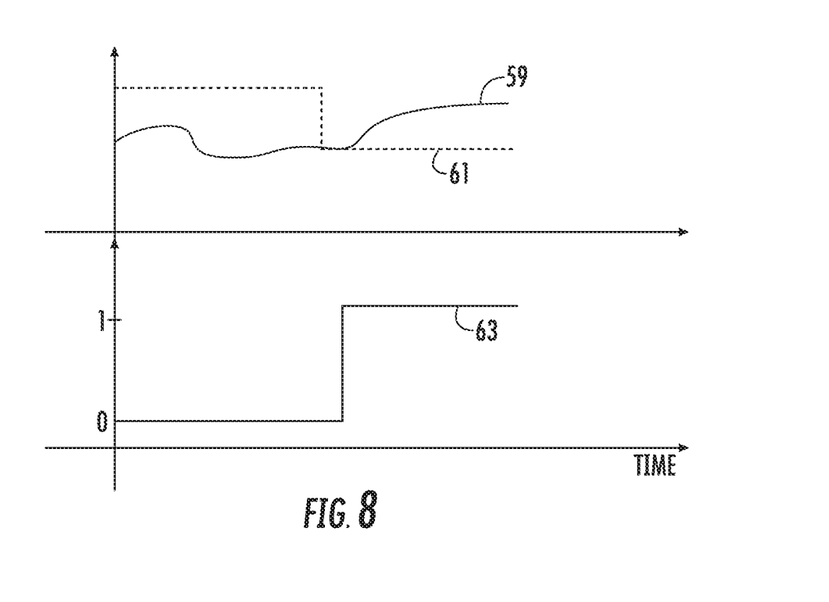
FIG. 8 illustrates a graph of time versus power according to the present disclosure, particularly illustrating how the power set point changes when the control scheme of the present disclosure is activated.

Referring now to FIGS. 7 and 8, one of the modules of the torque shaper 60 may include a power set point sequence module 72. As such, the power set point sequence module 72 assists to initialize the power set point regulator so as to minimize the error with respect to power feedback, thereby creating a bumpless transfer of the power set point. More specifically, as shown, when the control scheme is activated (as indicated by line 63 changing from zero to one in FIG. 8), the power set point sequencing block 57 receives the power feedback 59 from the grid 12 and sets the power command 61 to a pre-event measured grid power (i.e. a measured power of the electrical grid 12 before the frequency event occurs). As such, the torque shaper 60 is configured to adjust the power set point as a function of the supplementary power correction factor 56 so as to temporarily boost the supplied power to the power grid 12 in response to the signal being outside of the respective signal range.

A temporary power boost may be obtained by temporarily absorbing energy from the energy source. For wind turbines, the additional energy is available from the turbine inertia and from excess wind. If desired, other forms of energy storage, besides inertia (such as battery storage) can also be used. In one embodiment, for example, the power may be increased by five to ten percent for up to ten seconds. Providing a transient response has several benefits in addition to grid stability, including, for example, use of stored energy that would not otherwise be available at the turbine output without the need to build in an operating margin (e.g., by curtailed mode operation).

Figure 9:
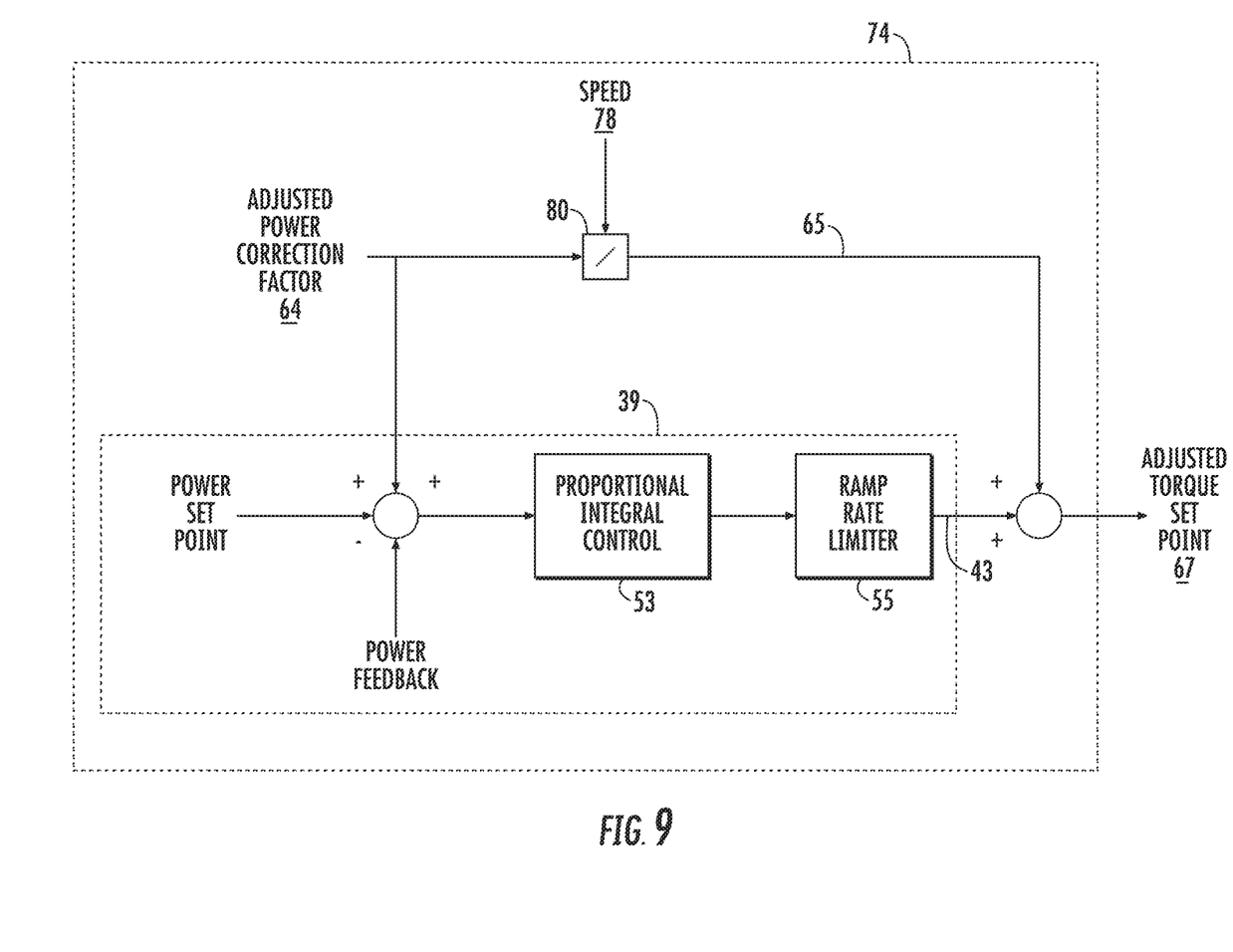
FIG. 9 illustrates a detailed schematic block diagram of one embodiment of the turbine controller according to the present disclosure, particularly illustrating a power regulator generating a torque set point.

Referring now to FIG. 9, another one of the modules of the torque shaper 60 may include a power regulator optimization module 74. More specifically, as shown in FIG. 9, the power regulator optimization module 74 is configured to calculate a torque correction factor 65 as a function of the adjusted power correction factor 64 and a speed 78 of the power generation system 10. In such embodiments, the torque correction factor 65 can be added to the torque set point 43 as a feedforward term to obtain an adjusted torque set point 67. In other words, as shown, the adjusted power correction factor 64 is fed to the power regulator optimization module 74 of the turbine controller 31 in two places: to the power regulator closed loop to ensure that the power regulator is optimized and as a feedforward term for quick response. If the power generation system 10 is operating in the below rated mode of operation when the frequency event is detected, the turbine controller 31 is configured to switch the mode to the above rated mode of operation in response to the signal 23 being outside of the respective signal range. In further embodiments, the turbine controller 31 may also switch the mode back to the below rated mode of operation in response to the signal returning within the respective signal range.

Figure 10:
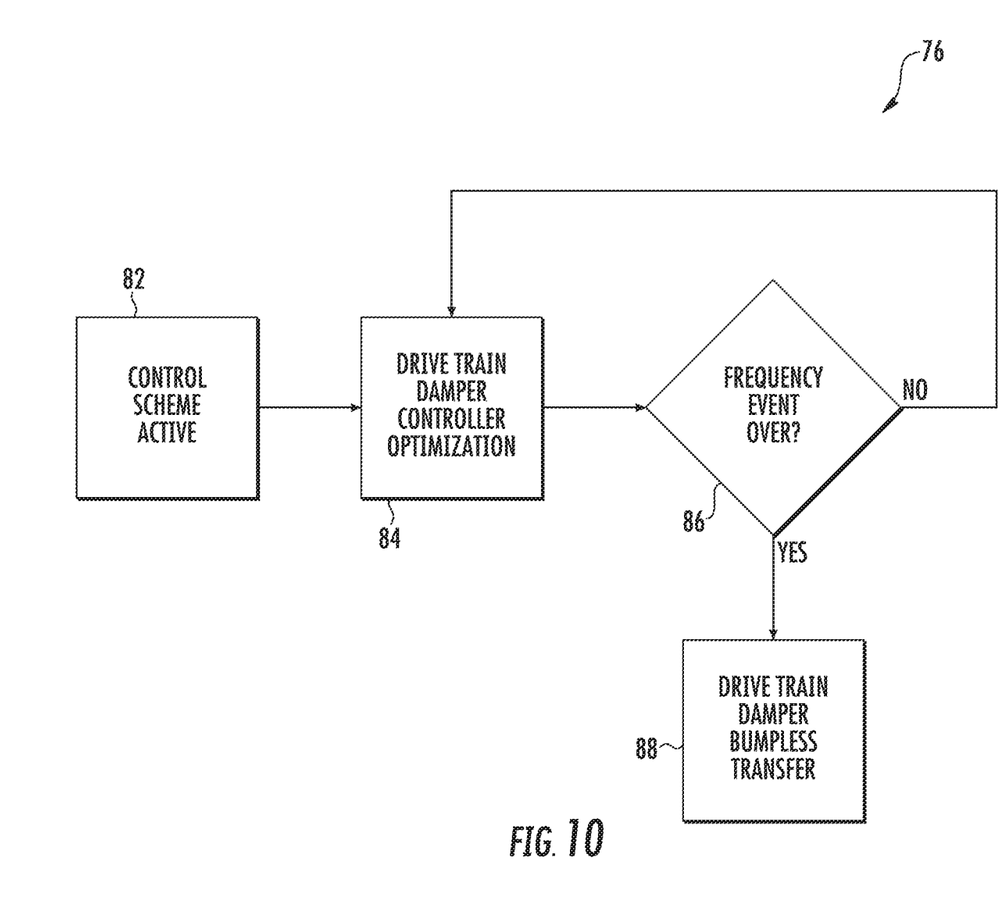
FIG. 10 illustrates a schematic block diagram of one embodiment of the turbine controller sequencing a drivetrain damper with the control scheme of the present disclosure.
Figure 11:
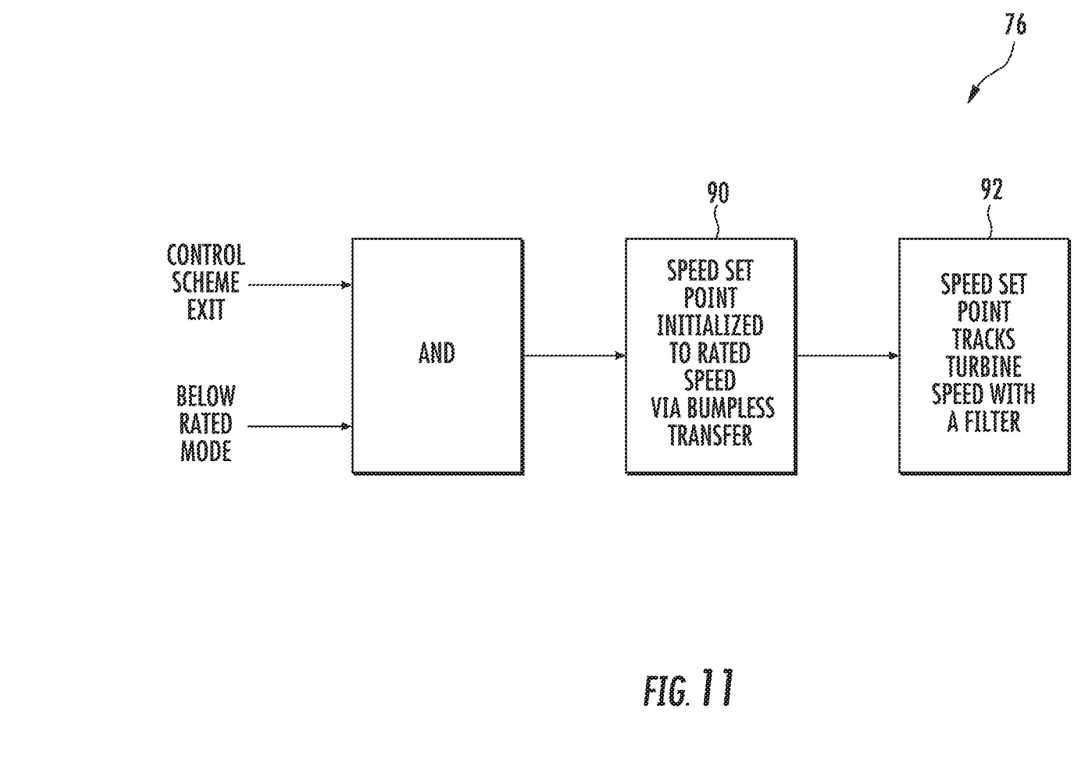
FIG. 11 illustrates a schematic block diagram of one embodiment of the turbine controller operating in a below rated mode and transitioning out of the control scheme of the present disclosure with a bumpless transfer.

Referring now to FIGS. 10 and 11, still another one of the modules of the torque shaper 60 may include a bumpless transfer module 76. For example, as shown in FIG. 10, when the control scheme is active 82, the module 76 is configured to optimize operation of the system 10, however, oftentimes, there are multiple control loops active during operation thereof that can reduce the power output of the system 10. For example, in one embodiment, one of the control loops may include the drivetrain damper of the power generation system 10, which may reduce the power output of the system 10. Accordingly, in certain embodiments, the bumpless transfer module 76 is configured to disable the drivetrain damper of the wind turbine 10 in response to the signal 23 being outside of the respective signal range to prevent a power reduction. Thus, as shown at 86 of FIG. 10, the module 76 is configured to determine when the frequency event is over, and then provide a drivetrain damper bumpless transfer 88. For example, in certain embodiments, the module 76 implements the bumpless transfer 88 via a low-pass filter. In addition, referring back to FIG. 3, the output of the bumpless transfer module 76 may be fed through a torque damper 68 before being provided to the turbine controller 31.

Figure 12:
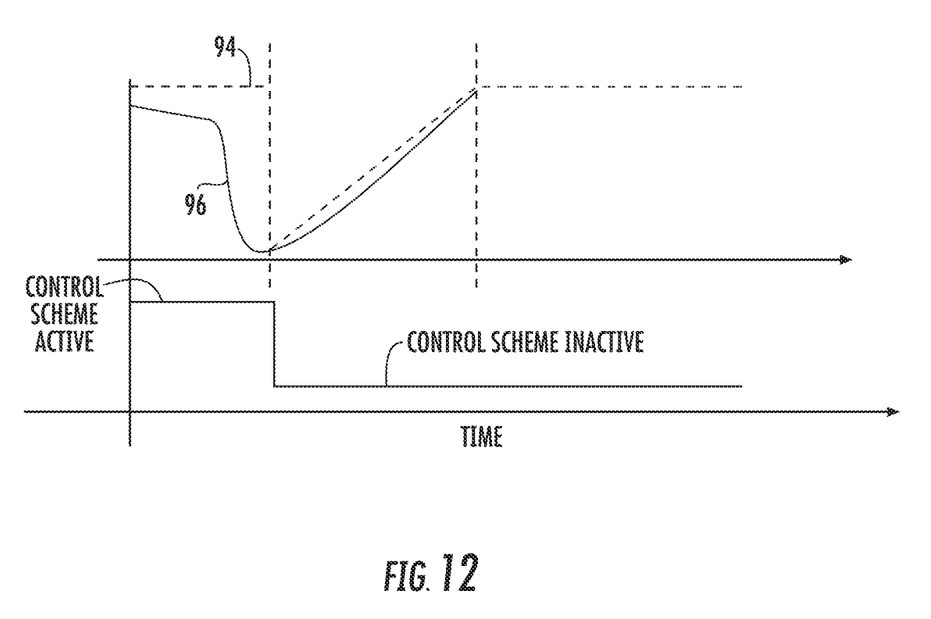
FIG. 12 illustrates a time plot of one embodiment of the turbine controller operating in a below rated mode and transitioning out of the control scheme of the present disclosure with a bumpless transfer.

In addition, as shown in FIGS. 11 and 12, as the control scheme exits (or is deactivated) and if the mode of the power generation system 10 is the below rated mode, then the speed set point 94 of the system 10 may be initialized or changed to a rated speed via bumpless transfer as shown at block 90. Similar to FIG. 11, as shown at 92 and FIG. 12, the speed set point 94 may track the turbine speed 96, e.g. via a low-pass filter. Thus, the module 76 is configured to gradually increase the speed set point 94 based on the tracking until the rated speed is reached so as to smoothly transition out of the control scheme. It should be understood that the speed set point 94 may be ramped back to the rated speed via a fixed or variable rate.

In another embodiment, if the power generation system 10 is operating in the above rated mode of operation, the bumpless transfer module 76 may transition out of the control scheme when the frequency event is over via a standard or normal operating process. For example, in one embodiment, the standard operating process may include increasing the adjusted power set point to a predetermined power set point.

Additionally, although wind turbines are illustrated as the energy sources, the concepts disclosed herein are believed to be applicable to any non-conventional energy sources with several other examples including battery energy storage, microturbines, and/or fuel cells. In wind turbine embodiments, for example, the power obtained from the stabilization system 21 is not supported by the wind, so the turbine will slow down to provide the power from the spinning inertia. In such embodiments, it is desirable to hold the adjustment signal long enough to obtain a desired power pulse before allowing the system to recover while operating under energy source constraints. In one specific example, the energy source includes a generator with a constraint on the rotation speed of the generator.

In addition to speed constraints, other operating constraints may include, for example, constraints such as turbine torque (magnitude and time) constraints, ramp rate constraints, and blade pitch operating constraints. Torque constraints are typically set based on turbine design (that is, by how much and for how long a turbine can withstand exceeding its rated operating point). The output frequency washout 42 can be used to build in protections for such operating constraints.

Various options exist for distributed and system (or "central") level control. In one embodiment, the deadband limiter 25, the power shaper 33, the limit controller 29, and/or the torque shaper 60 are embodied in a power generation system controller 32 (FIG. 2). In another embodiment, the deadband limiter 25, the power shaper 33, the limit controller 29, and/or the torque shaper 60 are embodied in a controller 24 of an energy source 14 (FIG. 2). As another alternative, a separate controller (not shown) may be coupled to either the system controller 32 or the source controller 24, or the various control sub-units/functions may be spread among several controllers.

Likewise, frequency estimation may be centralized or distributed. In other words, a frequency signal may be obtained by any desired means with several examples including: measurements at the energy source, measurements at a substation point 19 (FIG. 2), measurements at the utility connection, or information from the utility. Typically, measurements are obtained at a substation because power fluctuations will tend to modulate apparent frequency (defined as the rate of change of voltage angle) differently at each turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine connected to a power grid, the method comprising:
    monitoring a frequency of the power grid;
    in response to detecting a frequency event occurring in the power grid, activating a control scheme in order to meet one or more grid requirements of the power grid, the control scheme comprising:
        increasing a power output of the wind turbine to, at least, a pre-event measured grid power;
        calculating a power correction factor for a power set point of the wind turbine as a function of, at least, the frequency event;
        applying a gain to the power correction factor to obtain an adjusted power correction factor, the gain being determined as a function of one or more electrical or mechanical limits of the wind turbine;
        delivering the adjusted power correction factor to a power regulator optimization module in a closed loop in a first location;
        delivering the adjusted power correction factor to the power regulator optimization module in a second location as a feedforward term for quick response;
        adjusting the power set point via the adjusted power correction factor such that the power output follows a predetermined trajectory; and
        controlling, via a turbine controller, the wind turbine based on the adjusted power set point for as long as the control scheme is activated.

2. The method of claim 1, wherein the control scheme further comprises:
    calculating a torque correction factor as a function of the adjusted power correction factor and a speed of the wind turbine;
    adding the torque correction factor to a torque set point as a feedforward term; and adding the adjusted power correction factor to the power set point.

3. The method of claim 2, further comprising imposing an above rated mode when the control scheme is activated such that a speed regulator is governing a pitch angle and a power regulator is governing the torque set point.

4. The method of claim 3, further comprising switching a mode of operation when the control scheme is deactivated from the imposed above rated mode to an optimum operation condition or switching the mode of operation from the above rated mode of operation to a below rated mode of operation where the speed regulator is controlling the torque set point.

5. The method of claim 4, wherein, if the wind turbine is operating in the below rated mode of operation when the frequency event is detected, the method further comprises switching the mode to the above rated mode of operation when the control scheme is activated.

6. The method of claim 5, further comprising switching the mode back to the below rated mode of operation when the frequency event is over.

7. The method of claim 6, wherein the control scheme further comprises changing a speed set point of the wind turbine to a rated speed of the wind turbine via a bumpless transfer.

8. The method of claim 7, wherein, while switching the mode back to the below rated mode of operation, the step of changing the speed set point of the wind turbine to the rated speed of the wind turbine via the bumpless transfer further comprises:
  tracking, via at least one filter, a current speed of the wind turbine; and
  gradually increasing the speed set point based on the tracking until the rated speed is reached so as to smoothly transition out of the control scheme.

9. The method of claim 3, wherein, if the wind turbine is operating in the above rated mode of operation, the method further comprises:
  transitioning out of the control scheme when the frequency event is over via a standard operating process, the standard operating process comprising:
  increasing the adjusted power set point to a predetermined power set point.

10. The method of claim 1, further comprising disabling one or more control loops of the turbine controller for as long as the control scheme is activated, wherein disabling the one or more control loops prevents an additional power drop of the wind turbine.

11. A method for controlling a wind turbine connected to a power grid, the method comprising:
  monitoring a frequency of the power grid;
  in response to detecting a frequency event occurring in the power grid, activating a control scheme in order to meet one or more grid requirements of the power grid, the control scheme comprising:
  calculating a power correction factor for the power set point as a function of, at least, the frequency event;
  applying a gain to the power correction factor to obtain an adjusted power correction factor, the gain being determined as a function of one or more electrical or mechanical limits of the wind turbine;
  delivering the adjusted power correction factor to a power regulator optimization module in a closed loop in a first location;
  delivering the adjusted power correction factor to the power regulator optimization module in a second location as a feedforward term for quick response;
  calculating a torque correction factor as a function of the adjusted power correction factor and a speed of the wind turbine;
  adjusting the power set point via the adjusted power correction factor;
  adding the torque correction factor to the adjusted power set point as a feedforward term; and
  controlling, via a turbine controller, the wind turbine based on the adjusted power set point for as long as the control scheme is activated.

12. A stabilization system for a wind power generation system connected to a power grid, the stabilization system comprising:
  a processor performing:
  a dead band limiter for detecting when a signal is outside of a respective signal range, wherein the signal comprises a frequency;
  a power shaper for providing a supplementary power correction factor as a function of the frequency;
  a torque shaper for initially increasing a power output of the wind turbine to a pre-event measured grid power and adjusting the power set point as a function of the an adjusted supplementary power correction factor so as to temporarily boost the supplied power to the power grid in response to the signal being outside of the respective signal range, the torque shaper comprising:
  a gain block for applying a gain to the power correction factor to obtain the adjusted power correction factor, the gain being determined as a function of one or more electrical or mechanical limits of the wind turbine, and
  a power regulator optimization module configured to calculate a torque correction factor as a function of the adjusted power correction factor and a speed, the power regulator optimization module being configured to receive the adjusted power correction factor in a closed loop in a first location and in a second location as a feedforward term for quick response; and
  a turbine controller for controlling the wind turbine based on the adjusted power set point for as long as the signal is outside of the respective signal range.

13. The stabilization system of claim 12, wherein the power regulator is configured to add the torque correction factor to a torque set point as a feedforward term, and add the adjusted power correction factor to the power set point.

14. The stabilization system of claim 13, further comprising an operational mode selector for determining a mode of operation of the wind turbine, wherein the operational mode selector is configured to impose an above rated mode when the control scheme is activated such that a speed regulator is governing a pitch angle and a power regulator is governing the torque set point.

15. The stabilization system of claim 14, wherein the operational mode selector is further configured to switch a mode of operation when the control scheme is deactivated from the imposed above rated mode to an optimum operation condition or switch the mode of operation from the above rated mode of operation to a below rated mode of operation where the speed regulator is controlling the torque set point.

16. The stabilization system of claim 15, wherein, if the wind turbine is operating in the below rated mode of operation when the frequency event is detected, the turbine controller switches the mode to the above rated mode of operation in response to the signal being outside of the respective signal range, wherein the turbine controller switches the mode back to the below rated mode of operation in response to the signal returning within the respective signal range.

17. The stabilization system of claim 14, further comprising a bumpless transfer module for changing a speed set point of the wind turbine to a rated speed of the wind turbine while switching the mode operation back to the below rated mode of operation, the bumpless transfer module comprising a low-pass filter for tracking a current speed of the wind turbine and gradually increasing the speed set point based on the tracking until the rated speed is reached so as to smoothly transition out of the control scheme.

18. The stabilization system of claim 13, wherein the turbine controller disables one or more control loops programmed therein in response to the signal being outside of the respective signal range, wherein disabling the one or more control loops prevents an additional power drop of the wind turbine.

\* \* \* \* \*